(12) United States Patent
Dickerson et al.

(10) Patent No.: US 11,499,015 B1
(45) Date of Patent: Nov. 15, 2022

(54) MACROMOLECULAR NETWORKS AND PROCESS FOR MAKING SAME

(71) Applicant: Government of the United States, as represented by the Secretary of the Air Force, Wright-Patterson AFB, OH (US)

(72) Inventors: Matthew B. Dickerson, Beavercreek, OH (US); Luke A. Baldwin, London, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 219 days.

(21) Appl. No.: 16/247,975

(22) Filed: Jan. 15, 2019

(51) Int. Cl.
| | | |
|---|---|---|
| C08G 77/60 | (2006.01) | |
| C08F 275/00 | (2006.01) | |
| C01B 32/963 | (2017.01) | |
| C08G 83/00 | (2006.01) | |
| C08F 130/08 | (2006.01) | |
| C08G 77/12 | (2006.01) | |
| C08G 77/14 | (2006.01) | |

(52) U.S. Cl.
CPC ............ *C08G 77/60* (2013.01); *C01B 32/963* (2017.08); *C08F 130/08* (2013.01); *C08F 275/00* (2013.01); *C08G 83/005* (2013.01); *C08G 77/12* (2013.01); *C08G 77/14* (2013.01)

(58) Field of Classification Search
CPC ................................ C08G 77/60; C08L 83/04
See application file for complete search history.

(56) References Cited

U.S. PATENT DOCUMENTS

| | | | |
|---|---|---|---|
| 4,017,820 | A | 4/1977 | Ross |
| 5,229,102 | A | 7/1993 | Minet et al. |
| 6,367,412 | B1 | 4/2002 | Ramaswamy et al. |
| 6,451,870 | B1 * | 9/2002 | DeCato .................. C08L 83/06 522/99 |
| 6,730,802 | B2 | 5/2004 | Shen et al. |
| 7,029,634 | B2 | 4/2006 | Sherwood, Jr. |
| 7,056,849 | B2 | 6/2006 | Wan et al. |
| 7,714,092 | B2 | 5/2010 | Shen |
| 8,742,008 | B2 | 6/2014 | Shen et al. |
| 2003/0003127 | A1 | 1/2003 | Brown et al. |
| 2004/0161596 | A1 | 8/2004 | Taoka et al. |

FOREIGN PATENT DOCUMENTS

JP 2009-256507 A * 11/2009

OTHER PUBLICATIONS

"Synthesis of a Two-Component Carbosilane System for the Advanced Manufacturing of Polymer-Derived Ceramics" authored by Baldwin et al. and published in Chem. Mater. (2018) 30, 7527-7534.*
"Highly Effective Free Radical-catalyzed Curing of Hyperbranced Polycarbosilane for near Stoichiometric SiC Ceramics" authored by Li et al. and published in the J Am Ceram Soc. (2019) 102, 1041-1048.*
"Silicon-Containing Dendritic Polymers" edited by Dvornic et al. and published by © 2009 Springer Science and Business Media B.V. (Front matter and Chapter 3).*
Machine translation of JP 2009-256507 A.*
Lewis, Larry N.; Uriarte, Richard J.; Hydrosilylation Catalyzed by Metal Colloids: A Relative Activity Study Organometallics 1990, 9, 621-625.
Feng, Z.C.; Tin, C.C.; Hu, R.; Williams, J.; Raman and Rutherford backscattering analyses of cubic Sic thin films grown on Si by vertical chemical vapor deposition. Thin Solid Films 1995, 266, 1-7.
Langford, J.I.; Wilson, A. J. C.; Seherrer after Sixty Years: A Survey and Some New Results in the Determination of Crystallite Size. J. Appl. Cryst. 1978, 11, 102-113.
Xu, Yongan; Guron, Marta; Zhu, Xuelian; Sneddon, Larry G.; Yang, Shu; Template Synthesis of 3D High-Temperature Silicon-Oxycarbide and Silicon-Carbide Ceramic Photonic Crystals from Interference Lithographically Patterned Organosilicates. Chem. Mater. 2010, 22, 5957-5963.
Li, Jie; Yang, Shu; Fabrication of high-aspect-ratio (up to 10) one-dimensional organic/inorganic hybrid nanogratings via holographic lithography. Microelectronic Engineering 2014, 128, 7-11.
Liu, W.; Wu, H. J.; Maciel, G. E.; Interrante., L V. Investigation of the Pyrolytic Conversion of Poly (Silylenemethylene) to Silicon Carbide. Chem Mat 1999, 11, 2038-2048.
Rushkin, I. L.; Shen, Q.; Lehman, S. E.; Interrante, L. V.; Modification of a Hyperbranched Hydridopolycarbosilane as a Route to New Polycarbosilanes. Macromolecules 1997, 30, 3141-3146.
Roesler, R.; Har, B. J. N.; Piers, W. E. Synthesis and Characterization of (Perfluoroaryl)Borane-Functionalized Carbosilane Dendrimers and Their Use as Lewis Acid Catalysts for the Hydrosilation of Acetophenone. Organometallics 2002, 21 (21), 4300-4302.
Reddy, S.K.; Cramer, N.B.; Cross, T.; Raj, R.; Bowman, C.N.; Polymer-Derived Ceramic Materials from Thiol-ene Photopolymerizations. Chem. Mater. 2003, 15, 4257-4261.
Stein, Judith; Lewis, L. N.; Gao, Y.; Scott, R. A.; In Situ Determination of the Active Catalyst in Hydrosilylation Reactions Using Highly Reactive Pt(0) Catalyst Precursors. J. Am. Chem. Soc. 1999, 121, 3693-3703.
Yajima, S.; Hasegawa, Y.; Hayashi, J.; Iimura, M. Synthesis of Continuous Silicon Carbide Fibre with High Tensile Strength and High Young's Modulus. J. Mater. Sci. 1978, 13 (12), 2569-2576.
Hasegawa, Y.; Iimura, M.; Yajima, S. Synthesis of Continuous Silicon Carbide Fibre. J. Mater. Sci. 1980, 15 (3), 720-728.

(Continued)

*Primary Examiner* — Marc S Zimmer
(74) *Attorney, Agent, or Firm* — AFMCLO/JAZ; James F. McBride

(57) ABSTRACT

The present invention relates to processes for making macromolecular networks, macromolecular networks made by such processes, and methods of using such macromolecular networks to make materials such as ceramics. The macromolecular network's formation rate is controlled by using two species of reactants each of which comprised one functionality. This results in decreased macromolecular network processing costs and superior products.

16 Claims, 1 Drawing Sheet

(56) References Cited

OTHER PUBLICATIONS

Fitzgerald, T. J.; Mortensen, A. Processing of Microcellular SiC Foams. J. Mater. Sci. 1995, 30, 1025-1032.

De Hazan, Y.; Penner, D. SiC and SiOC Ceramic Articles Produced by Stereolithography of Acrylate Modified Polycarbosilane Systems. J. Eur. Ceram. Soc. 2017. Doi. 10.1016/j.jeurceramsoc.2017.03.021.

Ly, H. Q.; Taylor, R.; Day, R. J.; Heatley, F. Conversion of Polycarbosilane (PCS) to SiC-Based Ceramic Part I. Characterisation of PCS and Curing Products. J. Mater. Sci. 2001, 36, 4037-4043.

Ly, H. Q.; Taylor, R.; Day, R. J.; Heatley, F. Conversion of Polycarbosilane (PCS) to SiC-Based Ceramic Part II. Pyrolysis and characterisation. J. Mater. Sci. 2001, 36, 4045-4057.

Rathore, J. S.; Interrante, L. V. A Photocurable, Photoluminescent, Polycarbosilane Obtained by Acyclic Diene Metathesis (ADMET) Polymerization. Macromolecules 2009, 42 (13), 4614-4621.

Rangarajan, S.; Aswath, P. B. Role of Precursor Chemistry on Synthesis of Si—O—C and Si—O—C—N Ceramics by Polymer Pyrolysis. J. Mater. Sci. 2011, 46 (7), 2201-2211.

Du, B.; Hong, C.; Wang, A.; Zhou, S.; Qu, Q.; Zhou, S.; Zhang, X. Preparation and Structural Evolution of SiOC Preceramic Aerogel during High-Temperature Treatment. Ceram. Int. 2018, 44 (1), 563-570.

Bouzat, F.; Graff, A.-R.; Lucas, R.; Foucaud, S. Preparation of C/SiC Ceramics Using a Preceramic Polycarbosilane Synthesized via Hydrosilylation. J. Eur. Ceram. Soc. 2016, 36 (12), 2913-2921.

Yu, Z.; Min, H.; Yang, L.; Feng, Y.; Zhang, P.; Riedel, R. Influence of the Architecture of Dendritic-like Polycarbosilanes on the Ceramic Yield. J. Eur. Ceram. Soc. 2015, 35 (4), 1161-1171.

Li, H.; Zhang, L.; Cheng, L.; Wang, Y.; Yu, Z.; Huang, M.; Tu, H.; Xia, H. Effect of the Polycarbosilane Structure on Its Final Ceramic Yield. J. Eur. Ceram. Soc. 2008, 28 (4), 887-891.

Hu, J.; Carver, P. I.; Meier, D. J.; Stark, E. J.; Xu, N.; Zhang, T.; Hartmann-Thompson, C.; Dvornic, P. R. Hyperbranched Polycarbosiloxanes and Polycarbosilanes via Bimolecular Non-Linear Hydrosilylation Polymerization. Polymer 2012, 53 (24), 5459-5468.

Yu, Z.; Zhan, J.; Huang, M.; Li, R.; Zhou, C.; He, G.; Xia, H. Preparation of a Hyperbranched Polycarbosilane Precursor to SiC Ceramics Following an Efficient Room-Temperature Cross-Linking Process. J. Mater. Sci. 2010, 45 (22), 6151-6158.

Sorarù, G. D.; Dalcanale, F.; Campostrini, R.; Gaston, A.; Blum, Y.; Carturan, S.; Aravind, P. R. Novel Polysiloxane and Polycarbosilane Aerogels via Hydrosilylation of Preceramic Polymers. J. Mater. Chem. 2012, 22 (16), 7676.

Bruzzoniti, M. C.; Appendini, M.; Rivoira, L.; Onida, B.; Del Bubba, M.; Jana, P.; Sorarù, G. D. Polymer-Derived Ceramic Aerogels as Sorbent Materials for the Removal of Organic Dyes from Aqueous Solutions. J. Am. Ceram. Soc. 2018, 101 (2), 821-830.

Xue, F.; Zhou, K.; Wu, N.; Luo, H.; Wang, X.; Zhou, X.; Yan, Z.; Abrahams, I.; Zhang, D. Porous SiC Ceramics with Dendritic Pore Structures by Freeze Casting from Chemical Cross-Linked Polycarbosilane. Ceram. Int. 2018, 44, 6293-6299.

Yoon, B.-H.; Lee, E.-J.; Kim, H.-E; Koh, Y.-H. Highly Aligned Porous Silicon Carbide Ceramics by Freezing Polycarbosilane/Camphene Solution. J. Am. Ceram. Soc. 2007, 90 (6), 1753-1759.

Drohmann, C.; Möller, M.; Gorbatsevich, O. B.; Muzafarov, A. M. Hyperbranched Polyalkenylsilanes by Hydrosilylation with Platinum Catalysts. I. Polymerization. J. Polym. Sci. Part Polym. Chem. 2000, 38, 741-751.

Voit, B. I.; Lederer, A. Hyperbranched and Highly Branched Polymer Architectures—Synthetic Strategies and Major Characterization Aspects. Chem. Rev. 2009, 109 (11), 5924-5973.

Zheng, Y.; Li, S.; Weng, Z.; Gao, C. Hyperbranched Polymers: Advances from Synthesis to Applications. Chem. Soc. Rev. 2015, 44 (12), 4091-4130.

Zhang, G.-B.; Kong, J.; Fan, X.-D.; Li, X.-G.; Tian, W.; Huang, M.-R. UV-Activated Hydrosilylation: A Facile Approach for Synthesis of Hyperbranched Polycarbosilanes. Appl. Org. Chem. 2009, 23, 277-282.

Wang, D.; Klein, J.; Mejía, E. Catalytic Systems for the Cross-Linking of Organosilicon Polymers. Chem.—Asian J. 2017, 12 (11), 1180-1197.

Whitmarsh, Chris K.; Interrante, Leonard V.; Synthesis and Structure of a Highly Branched Polycarbosllane Derived from (Chloromethyl)trichiorosilane. Organometallics. 1991, 10, 1336-1344.

Kolel-Veetil, M. K.; Keller, T. M. Formation of Elastomeric Network Polymers from Ambient Heterogeneous Hydrosilations of Carboranylenesiloxane and Branched Siloxane Monomers. J. Polym. Sci. Part Polym. Chem. 2006, 44 (1), 147-155.

Bouillon, E.; Pailler, R.; Naslain, R. New Poly(Carbosilane) Modles. 5. Pyrolysis of a Series of Functional Poly (Carbosilanes). Chem. Mater 1991, 3 (2), 356-367.

Naviroj, M.; Miller, S. M.; Colombo, P.; Faber, K. T. Directionally Aligned Macroporous SiOC via Freeze Casting of Preceramic Polymers. J. Eur. Ceram. Soc. 2015, 35 (8), 2225-2232.

Abbasi, E; Aval, S.F.; Akbarzadeh, A; Milani, M; Nasrabadi, H.T.; Joo, S.W.; Hanifehpour, Y.; Kazem Vejati-Koshki, K.; Pashaei-Asl, R.; Dendrimers: synthesis, applications, and properties. Nanoscale Research Letters 2014, 9:247, 1-10.

Key, Thomas S.; Wilks, Garth B.; Parthasarathy, Triplicane A.; King, Derek S.; Apostolov, Zlatomir D.; Cinibulk, Michael K. Process modeling of the low-temperature evolution and yield of polycarbosilanes for ceramic matrix composites. J Am Ceram Soc., 2018, 101, 2809-2818.

Colombo, P.; Mera, G; Riedel, R; Soraru', G.D.; Polymer-Derived Ceramics: 40 Years of Research and Innovation in Advanced Ceramics. J. Am. Ceram. Soc., 2010, 93 [7] 1805-1837.

Ding, D; Processing, properties and applications of ceramic matrix composites, SiCf/SiC: an overview. DOI: 10.1533/9780857098825.1.9, 2014, 9-26.

Dong, S. M.; Chollon, G.; Labrug 'e Re, C.; Lahaye, M.; Guette, A.; Bruneel, J. L.; Couzi, M.; Naslain, R.; Jiang, D. L.; Characterization of nearly stoichiometric SiC ceramic fibres. J. Mater. Sci. 2001, 36, 2371-2381.

Liang, Tian; Li, Ya-Li; Su, Dong; Du, He-Bao; Silicon oxycarbide ceramics with reduced carbon by pyrolysis of polysiloxanes in water vapor. J. Eur. Ceram. Soc. 2010, 30, 2677-2682.

Dykes, Graham M.; Review Dendrimers: a review of their appeal and applications. J. Chem. Technol. Biotechnol. 2001, 76, 903-918.

Ceña-D'Iez, Rafael; Sep'ulveda-Crespo, Daniel; Maly, Marek; Muñoz-Fern'andez, Ma A.; Dendrimeric based microbicides against sexual transmitted infections associated to heparin sulfate RSC Adv., 2016, 6, 46755-46764.

Froehling, Peter E.; Synthesis and Properties of a New, Branched Polyhydridocarbosilane as a Precursor for Silicon Carbide. Journal of Inorganic and Organometallic Polymers, 1993, vol. 3, No. 3, 251-258.

Ortega, P.; Cobaleda, B. M.; Hern'andez-Ros, J. M.; Fuentes-Paniagua,E.; S'anchez-Nieves, J.; Tarazona, M.P.; Jose Luis Copa-Patiño, J. L; Juan Soliveri, J.; De La Mata, F. J.; Rafael G'omez, R.; Hyperbranched polymers versus dendrimers containing a carbosilane framework and terminal ammonium groups as antimicrobial agents. Org. Biomol. Chem., 2011, 9, 5238-5248.

Houser, Eric J.; Keller, Teddy M.; Hydrosilation Routes to Materials with High Thermal and Oxidative Stabilities. J. Polym. Sci. Part A: Polym. Chem.: 1998, 36, 1969-1972.

Shuang, Muhe; Fang, Yunhui; Li, Ran; Huang, Tianhua; Yu, Zhaoju; Xia, Haiping; Synthesis and Jroperties of Liquid Polycarbosilanes with Hyperbranched Structures. Journal of Applied Polymer Science, 2009, vol. 113, 1611-1618.

King, Derek; Apostolov, Zlatomir; Key, Thomas; Carney, Carmen; Cinibulk, Michael; Novel processing approach to polymer-derived ceramic matrix composites. Int J Appl Ceram Technol., 2018, 15, 399-408.

(56) References Cited

OTHER PUBLICATIONS

Miester, Teresa K.; Riener, Korbinian; Gigler, Peter; Stohrer, Jurgen; Herrmann, Wolfgang A.; Kühn, Fritz E.; Platinum Catalysis Revisited—Unraveling Principles of Catalytic Olefin Hydrosilylation. ACS Catal. 2016, 6, 1274-1284.

Pham, Tuan Anh; Kim, Dong-Pyo; Lim, Tae-Woo; Park, Sang-Hu; Yang, Dong-Yol; Lee, Kwang-Sup; Three-Dimensional SiCN Ceramic Microstructures via Nano-Stereolithography of Inorganic Polymer Photoresists. Adv. Fund. Mater. 2006, 16, 1235-1241.

Maddocks, A. R.; Hook, J. M.; Stender, H.; Harris, A. T.; Heterogeneously catalyzed crosslinking of polycarbosilane with divinylbenzene. J Mater Sci 2008 43:2666-2674.

Bravo-Osuna, I.; Vicario-De-La-Torre, M.; Andrés-Guerrero, V.; Sánchez-Nieves, J.; Guzmán-Navarro, M.; De La Mata, F. J.; Gómez, R.; De Las Heras, B.; Argüeso, P.; Ponchel, G.; Herrero-Vanrell, R.; Molina-Martïnez, I. T.; Novel Water-Soluble Mucoadhesive Carbosilane Dendrimers for Ocular Administration. Mol. Pharmaceutics 2016, 13, 2966-2976.

Matsumoto, Kozo; Nakashita, Junichi; Matsuoka, Hideki; Synthesis of Silicon Nitride Based Ceramic Nanoparticles by the Pyrolysis of Silazane Block Copolymer Micelles. Journal of Polymer Science: Part A: Polymer Chemistry, 2006, vol. 44, 4696-4707.

Feldman, D. W.; Parker, James H. Jr.; Choyke, W. J.; Patrick, Lyle; Phonon Dispersion Curves by Raman Scattering in SiC, Polytypes 3C, 4H, 6H, 15R, and 21R. Physical Review, 1968, vol. 173, No. 3, 787-793.

Ortega, Paula; Moreno, Silvia; Tarazona, Ma P.; De La Mata, Fco. J.; Ramirez Rafael G.; New hyperbranched carbosiloxane-carbosilane polymers with aromatic units in the backbone. European Polymer Journal, 2012, 48, 1413-1421.

Rosenburg, Felix; Ionescuz, Emanuel; Nicoloso, Norbert; Riedel, Ralf; High-Temperature Raman Spectroscopy of Nano-Crystalline Carbon in Silicon Oxycarbide. Materials 2018, 11, 93, 1-9.

Ferrari, A. C.; Robertson, J.; Interpretation of Raman spectra of disordered and amorphous carbon. Physical Review B vol. 61, No. 20, 14095-14107.

Eckel, Zak C.; Zhou, Chaoyin; Martin, John H.; Jacobsen, Alan J.; Carter, William B.; Schaedler, Tobias A.; Additive manufacturing of polymer-derived ceramics. Science, 2016, 351 (6268), 58-62.

* cited by examiner

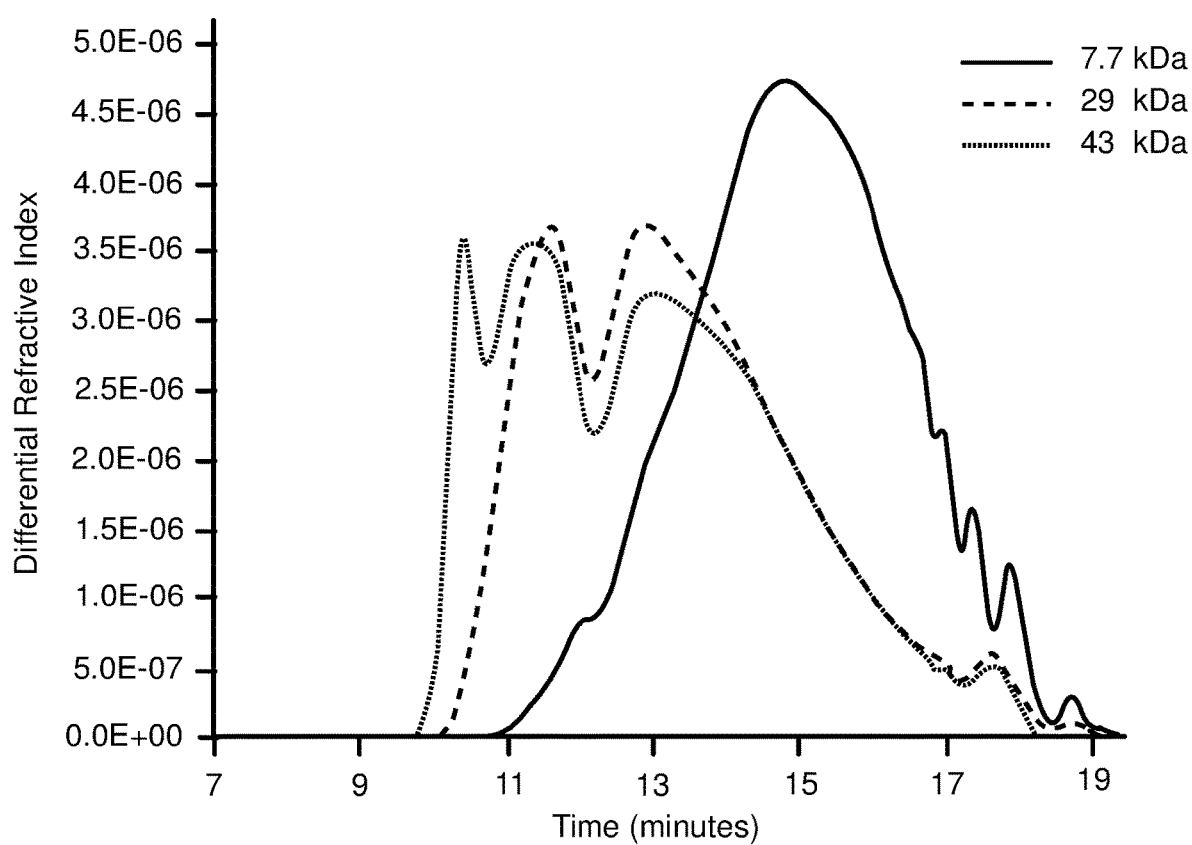

MACROMOLECULAR NETWORKS AND PROCESS FOR MAKING SAME

RIGHTS OF THE GOVERNMENT

The invention described herein may be manufactured and used by or for the Government of the United States for all governmental purposes without the payment of any royalty.

FIELD OF THE INVENTION

The present invention relates to processes for making macromolecular networks, macromolecular networks made by such processes, and methods of using such macromolecular networks.

BACKGROUND OF THE INVENTION

Macromolecular networks are valuable materials as they are used as coatings and in biomedical applications. In addition, macromolecular networks are used in the production of materials such as ceramics. Macromolecular networks, such as gels, are produced by a number of processes including single species curing. Single species curing involves intra and inter molecular crosslinking of a single polymer species that are bifunctional. Unfortunately, the resulting macromolecular network is difficult to process as the network formation rate is untailorable which results in increased processing costs and many time inferior products.

Applicants recognized that the source of the aforementioned problems was that both functionalities were on the same backbone. As a result, there was no ability to control the network's formation rate. Applicants discovered that the ability to control the network's formation rate could be obtained by using two species of reactants each of which comprised one functionality. While not being bound by theory, applicants believe that by using two species of reactants, each of which comprises one functionality, an easily adjusted stoichmetric control lever is obtained that results in decreased processing costs and superior products.

SUMMARY

The present invention relates to processes for making macromolecular networks, macromolecular networks made by such processes, and methods of using such macromolecular networks to make materials such as ceramics. The macromolecular network's formation rate is controlled by using two species of reactants each of which comprised one functionality. This results in decreased macromolecular network processing costs and superior products.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 1 is a graph depicting GPC traces for varying molecular weight hyperbranched polymers made via the examples of the present specification.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Macromolecular Networks

For purposes of this specification, headings are not considered paragraphs and thus this paragraph is Paragraph 0013 of the present specification. The individual number of each paragraph above and below this paragraph can be determined by reference to this paragraph's number. In this Paragraph 0013, Applicants disclose a macromolecular network derived from the reaction of:

a) one or more polymers comprising:
  (i) a backbone that comprises silicon; and
  (ii) reactive groups, each of said reactive groups being independently selected from carbon carbon double; or carbon carbon triple bonds;
b) one or more silane crosslinking agents, said silane crosslinking agents comprising at least two reactive groups.

Applicants disclose a macromolecular network according to Paragraph 0013 wherein said one or more polymer's reactive groups are covalently bound to said polymer's backbone via a covalent bond to a silicon atom.

Applicants disclose a macromolecular network according to any of Paragraphs 0013 through 0014 wherein:

a) said one or more polymers have a weight average molecular weight of from about 500 Da to about 200,000 Da, preferably from about 10,000 Da to about 100,000 Da; and
b) said one or more silane crosslinking agents comprising from 2 to 4 branching arms, preferably said branching arms are silane termini.

Applicants disclose a macromolecular network according to any of Paragraphs 0013 through 0015 wherein said one or more polymers are the polymerization product of one or more monomers selected from the group consisting of:

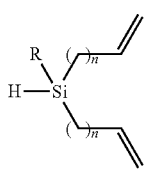

wherein R is selected from the group consisting of an alkyl, an aryl, a halogen or an alkoxy, and each indice n is independently an integer from 0 to 5; preferably said alkyl is —$CH_3$, —$CH_2CH_3$ or $CH_2CH_2CH_3$, preferably said aryl is $C_6H_5$, preferably said halogen is Br, Cl or I and preferably said alkoxy is $OCH_3$, or $OCH_2CH_3$,

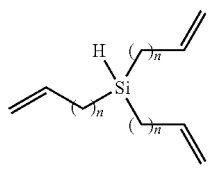

wherein each indice n is independently an integer from 0 to 5;

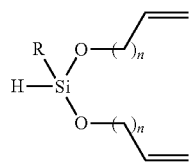

wherein R is selected from the group consisting of an alkyl, an aryl, a halogen or an alkoxy, and each indice n is independently an integer from 0 to 5; preferably said alkyl is —$CH_3$, —$CH_2CH_3$ or $CH_2CH_2CH_3$, preferably said aryl is $C_6H_5$, preferably said halogen is Br, Cl or I and preferably said alkoxy is $OCH_3$, or $OCH_2CH_3$,

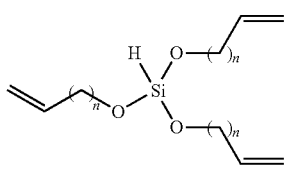

wherein each indice n is independently an integer from 0 to 5.

Applicants disclose a macromolecular network according to any of Paragraphs 0013 through 0016 wherein said one or more silane crosslinking agents are:

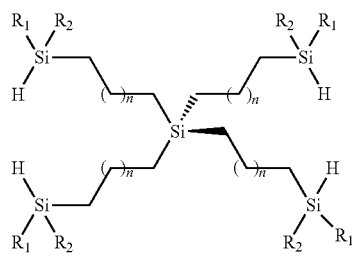

wherein each $R_1$ and $R_2$, is independently selected from the group consisting of a hydrogen, an alkyl or an aryl and each indice n is independently an integer of 0 or 1, preferably each alkyl is independently —$CH_3$, —$CH_2CH_3$, or $CH_2CH_2CH_3$ and each aryl is $C_6H_5$;

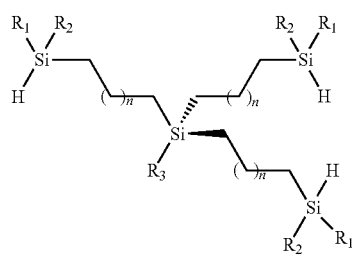

wherein each $R_1$, $R_2$, and $R_3$ is independently selected from the group consisting of a hydrogen, an alkyl or an aryl and each indice n is independently an integer of 0 or 1, preferably each alkyl is independently —$CH_3$, —$CH_2CH_3$, or $CH_2CH_2CH_3$ and each aryl is

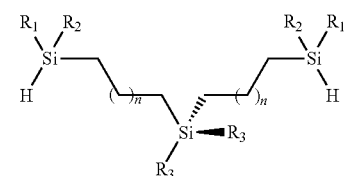

$C_6H_5$; and/or wherein each $R_1$, $R_2$, and $R_3$ is independently selected from the group consisting of a hydrogen, an alkyl or an aryl and each indice n is independently an integer of 0 or 1, preferably each alkyl is independently —$CH_3$, —$CH_2CH_3$, or $CH_2CH_2CH_3$ and each aryl is $C_6H_5$.

Applicants disclose a macromolecular network according to any of Paragraphs 0013 through 0017 wherein said one or more polymers and said one or more silane crosslinking agents are present at a ratio of from about 1:10 to about 10:1, preferably from about 1:6 to about 6:1, more preferably from about 1:3 to about 3:1.

Processes of Making Macromolecular Networks

Applicants disclose a process of making a macromolecular network comprising reacting one or more polymers and one or more silane crosslinking agents, said one or more polymers and said one or more silane crosslinking agents being reacted in a ratio of from about 1:10 to about 10:1, preferably from about 1:6 to about 6:1, more preferably from about 1:3 to about 3:1 said one or more polymers being the polymerization product of one or more of the monomers selected from the group consisting of:

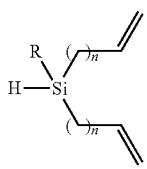

wherein R is selected from the group consisting of an alkyl, an aryl, a halogen or an alkoxy, and each indice n is independently an integer from 0 to 5, preferably said alkyl is —CH$_3$, —CH$_2$CH$_3$ or CH$_2$CH$_2$CH$_3$, preferably said aryl is C$_6$H$_5$, preferably said halogen is Br, Cl or I and preferably said alkoxy is OCH$_3$, or OCH$_2$CH$_3$;

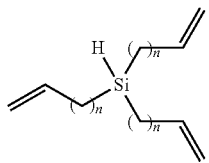

wherein each indice n is independently an integer from 0 to 5;

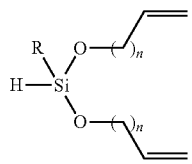

wherein R is selected from the group consisting of an alkyl, an aryl, a halogen or an alkoxy, and each indice n is independently an integer from 0 to 5, preferably said alkyl is —CH$_3$, —CH$_2$CH$_3$ or CH$_2$CH$_2$CH$_3$, preferably said aryl is C$_6$H$_5$, preferably said halogen is Br, Cl or I and preferably said alkoxy is OCH$_3$, or OCH$_2$CH$_3$,

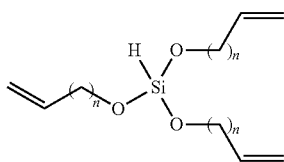

wherein each indice n is independently an integer from 0 to 5;
and said one or more silane crosslinking agents are selected from the following crosslinkers or mixtures thereof:

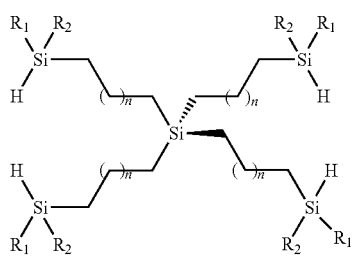

wherein each R$_1$ and R$_2$, is independently selected from the group consisting of a hydrogen, an alkyl or an aryl and each indice n is independently an integer of 0 or 1, preferably each alkyl is independently —CH$_3$, —CH$_2$CH$_3$, or CH$_2$CH$_2$CH$_3$ and each aryl is C$_6$H$_5$;

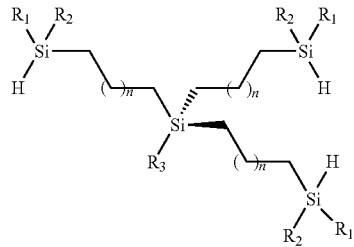

wherein each R$_1$, R$_2$, and R$_3$ is independently selected from the group consisting of a hydrogen, an alkyl or an aryl and each indice n is independently an integer of 0 or 1, preferably each alkyl is independently —CH$_3$, —CH$_2$CH$_3$, or CH$_2$CH$_2$CH$_3$ and each aryl is C$_6$H$_5$;

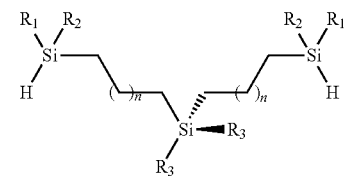

wherein each R$_1$, R$_2$, and R$_3$ is independently selected from the group consisting of a hydrogen, an alkyl or an aryl and each indice n is independently an integer of 0 or 1, preferably each alkyl is independently —CH$_3$, —CH$_2$CH$_3$, or CH$_2$CH$_2$CH$_3$ and each aryl is C$_6$H$_5$. Reaction conditions can alter weight average molecular weight for polymers used to make the macromolecular network. In one aspect, such a polymer can have a weight average molecular weight of from about 500 g/mol to about 200,000 g/mol.

The polymer and crosslinker can be gelled in inert atmosphere or ambient atmosphere, with or without catalysts (i.e. precious metals or radical generators). Presumably the residual platinum remaining from the hyperbranched polymerization facilitates room temperature crosslinking. A typical reaction procedure is listed below (taken from Baldwin et al. Chem. Mater. 2018, DOI:10.1021/acs.chemmater.8b02541)

Reaction of gelled mixture—A 2:1 weight ratio of polymer to crosslinker was generated by first dissolving the hyperbranched polymer (29 kDa, 470 mg) in 11.75 mL of toluene and then adding crosslinker (235 mg) and stirring overnight. The mixture was then concentrated on a rotavap at 50° C. and placed on high vacuum at 50° for 4 to 5 hours to isolate a gelled polymer material. The reaction is shown below.

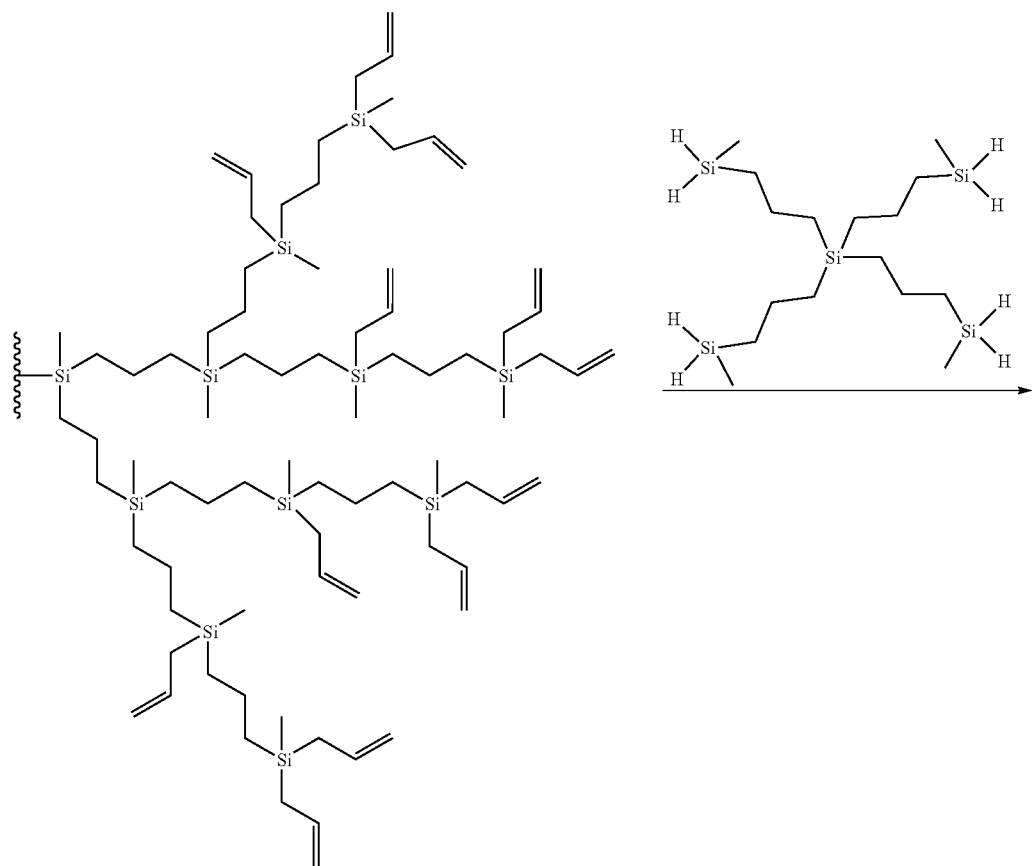

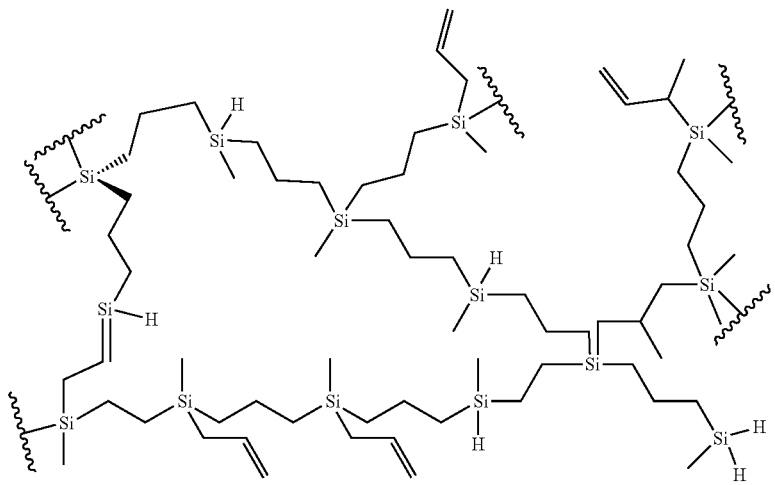

Processes of Making a Ceramic

Applicants disclose a process of making a ceramic said process comprising curing a macromolecular network according to any of Paragraphs 0013 through 0018 via heating, preferably said curing comprises heating said macromolecular network two or more times, with at least one of said heating steps being conducted in an inert atmosphere.

Curing can be done thermally in inert, moderate vacuum, or ambient air. A typical curing and ceramization procedure is listed below (taken from Baldwin et al. Chem. Mater. 2018, DOI:10.1021/acs.chemmater.8b02541)

A vial containing the polymer/crosslinker gelled mixture (described in section 9) was placed in a 20 mL borosilicate glass vial, left uncapped, heated to at a rate of 1° C./minute to 160° C., held for 1 hr and then heated to 280° C. and held for 5 hrs. The material then was cooled to room temperature providing a cured polycarbosilane with mass retention of 67%. This cured material can be further converted to SiOC ceramic by placing the bulk polymer in a graphite foil boat and heating in an inert atmosphere tube furnace at a rate of 3° C./minute. The sample was heated to 1600° C. and held for 2 hours before cooling. Transformation of the SiOC to SiC was performed by heating the ceramic, which had been heated to 1600° C., to 1800° C. in a graphite furnace. The sample was heated with a ramp rate of 20° C./minute, and held for 2 hours under inert atmosphere. This provides crystalline SiC with a 39% mass yield (1600-1800° C.).

Methods of Using Macromolecular Networks and Ceramics Produced Using Such Macromolecular Networks The ceramics disclosed herein may be used in almost any application requiring a ceramic. The ceramics disclosed herein are particularly suitable for applications wherein a higher ceramic ductility is desired. Such applications include catalysts, membranes, light-weight support structures, scaffolds, and energy storage materials (e.g. lithium-ion battery electrode). The skilled artisan can use the ceramics taught in the present specification in the aforementioned applications via the teaching of the present specification. Such application teachings can be supplemented by the teachings of U.S. Pat. No. 5,229,102 (porous ceramic catalytic membrane), U.S. Pat. No. 4,017,820 (porous ceramic humidity sensor), US20030003127A1 (porous ceramic composite tissue scaffold), U.S. Pat. No. 6,367,412 (porous ceramic for plasma source filter) and US20040161596A1 (porous ceramic for diesel particulate filter)

Test Methods

Weight Average Molecular Test Method

For the polymers used to make the macromolecular networks claimed and disclosed herein, size-exclusion chromatography (SEC) was carried out in THF at a flow rate of 1.0 mL/min using an Agilent1260 HPLC equipped with two Waters Styragel columns (HR3 and H4E). A Wyatt Optilab TrEX Refractive index (RI) detector was employed and relative molecular weights were determined by conventional calibration with polystyrene standards. For purposes of the present specification, such test method should be used to determine the weight average molecular polymers that are used to make macromolecular networks.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1. Production of a Macromolecular Network of Formula 1

A hyperbranched polymer is produced via the synthesis route below:

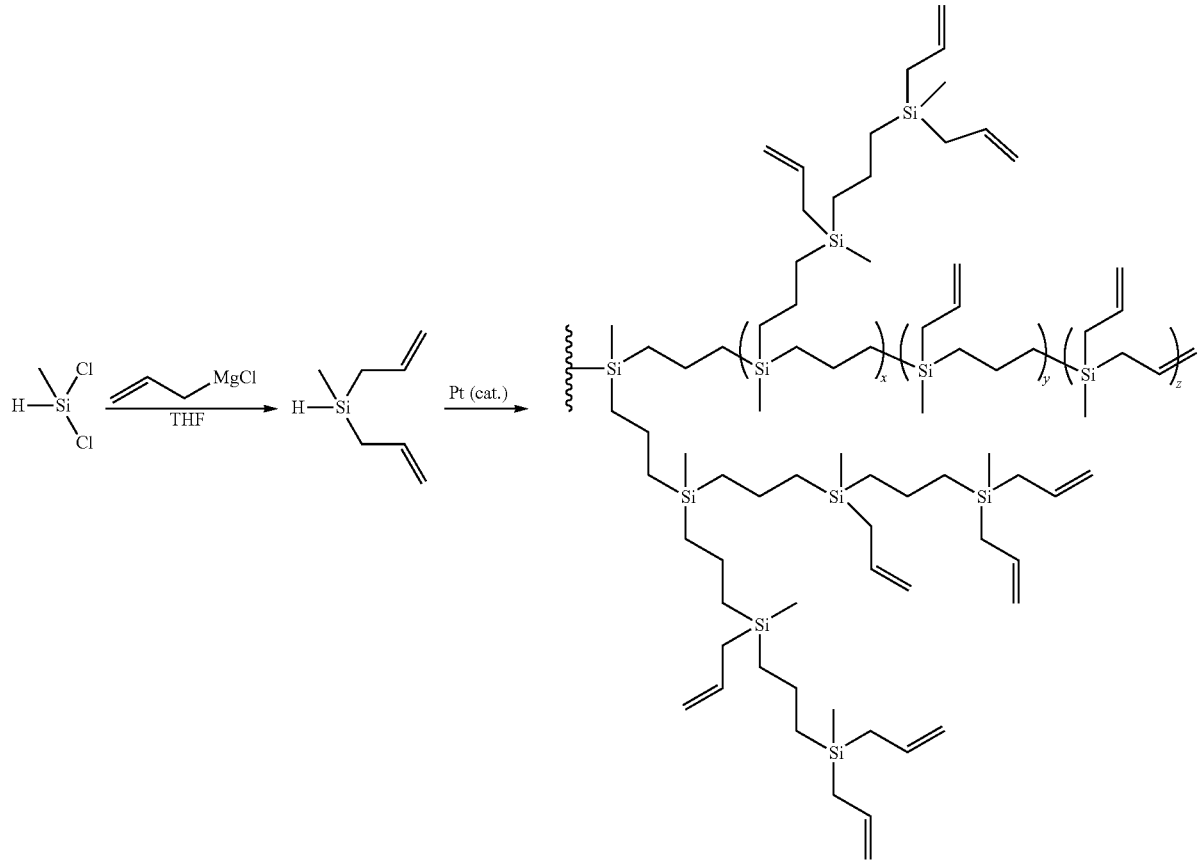

-continued
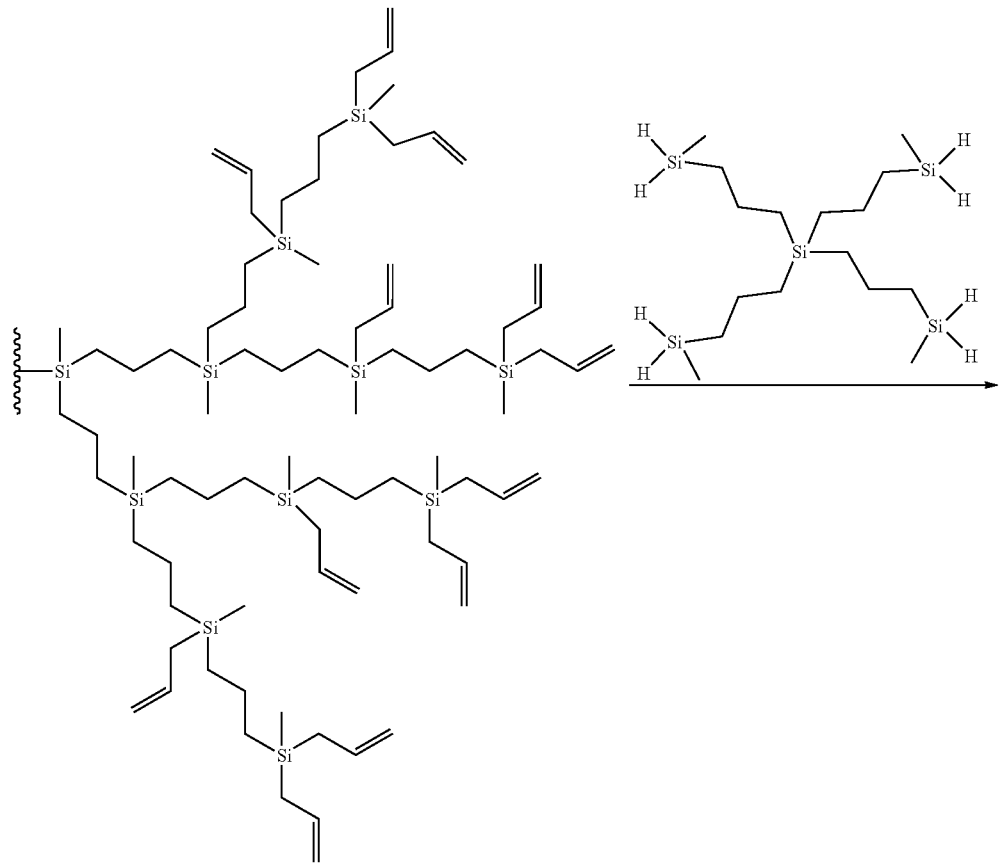
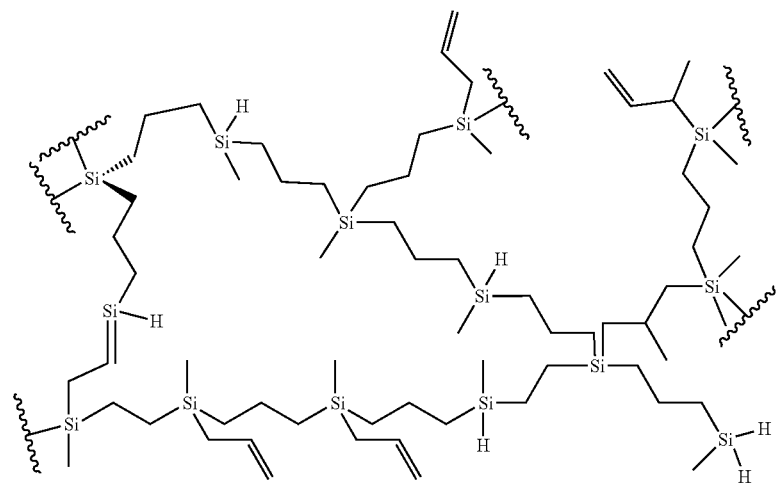

Example 1—Macromolecular Network Formation

The hyperbranched polymer has a sufficient number of x, y and z units to give the hyperbranched polymer a weight average molecular weight of about 30,000 grams per mole. Such molecular weight was determined in accordance with the test method provided in the Test Methods section of this specification for weight average molecular weight.

The results of such analysis are found in FIG. 1.

Example 2 Production of a Macromolecular Network

A macromolecular network is produced according to the synthesis of Example 1 except

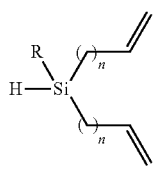

wherein R is selected from the group consisting of alkyl (i.e. —$CH_3$, —$CH_2CH_3$, $CH_2CH_2CH_3$), aryl (i.e. $C_6H_5$), halogen (i.e. Br, Cl, I) or alkoxy (i.e. $OCH_3$, $OCH_2CH_3$) and each indice n is independently an integer from 0 to 5 is substituted for.

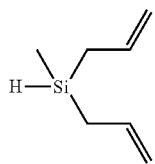

Example 3 Production of a Macromolecular Network

A macromolecular network is produced according to the synthesis of Example 1 except

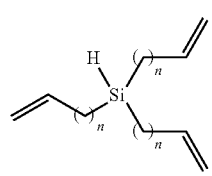

wherein R is selected from the group consisting of alkyl (i.e. —$CH_3$, —$CH_2CH_3$, $CH_2CH_2CH_3$), aryl (i.e. $C_6H_5$), halogen (i.e. Br, Cl, I) or alkoxy (i.e. $OCH_3$, $OCH_2CH_3$) and each indice n is independently an integer from 0 to 5 is substituted for.

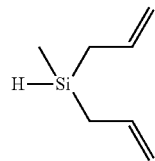

Example 4 Production of a Macromolecular Network

A macromolecular network is produced according to the synthesis of Example 1 except

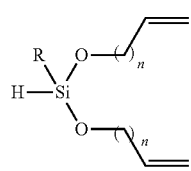

wherein R is selected from the group consisting of alkyl (i.e. —$CH_3$, —$CH_2CH_3$, $CH_2CH_2CH_3$), aryl (i.e. $C_6H_5$), halogen (i.e. Br, Cl, I) or alkoxy (i.e. $OCH_3$, $OCH_2CH_3$) and each indice n is independently an integer from 0 to 5 is substituted for.

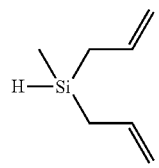

Example 5 Production of a Macromolecular Network

A macromolecular network is produced according to the synthesis of Example 1 except

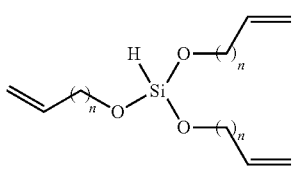

wherein R is selected from the group consisting of alkyl (i.e. —$CH_3$, —$CH_2CH_3$, $CH_2CH_2CH_3$), aryl (i.e. $C_6H_5$), halogen (i.e. Br, Cl, I) or alkoxy (i.e. $OCH_3$, $OCH_2CH_3$) and each indice n is independently an integer from 0 to 5 is substituted for

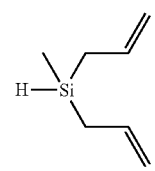

Example 6 Production of a Macromolecular Network

A macromolecular network is produced according to the synthesis of Example 1 except

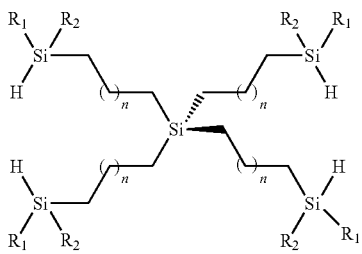

wherein each $R_1$ and $R_2$, is independently selected from the group consisting of hydrogen, an alkyl (i.e. —$CH_3$, —$CH_2CH_3$, $CH_2CH_2CH_3$) or aryl (i.e. $C_6H_5$), and each indice n is independently an integer of 0 or 1 is substituted for

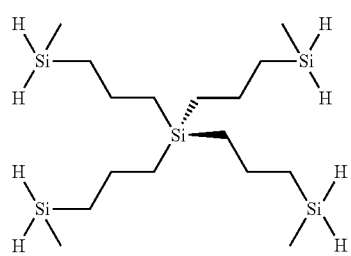

Example 7 Production of a Macromolecular Network

A macromolecular network is produced according to the synthesis of Example 1 except

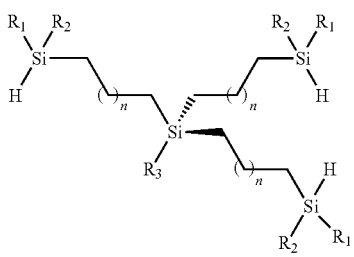

wherein each $R_1$, $R_2$, and $R_3$ is independently selected from the group consisting of hydrogen, an alkyl (i.e. —$CH_3$, —$CH_2CH_3$, $CH_2CH_2CH_3$) or aryl (i.e. $C_6H_5$), and each indice n is independently an integer of 0 or 1 is substituted for

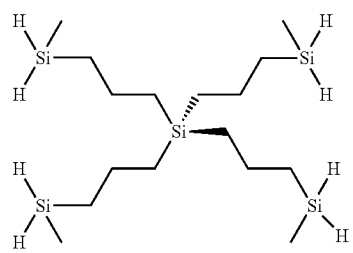

Example 8 Production of a Macromolecular Network

A macromolecular network is produced according to the synthesis of Example 1 except

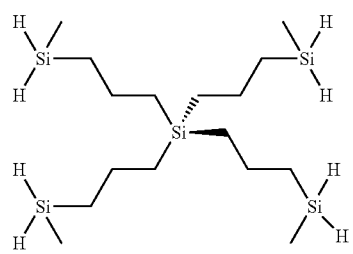

wherein each $R_1$, $R_2$, and $R_3$ is independently selected from the group consisting of hydrogen, an alkyl (i.e. —$CH_3$, —$CH_2CH_3$, $CH_2CH_2CH_3$) or aryl (i.e. $C_6H_5$), and each indice n is independently an integer of 0 or 1 substituted for

Example 9 Production of Crosslinker

The crosslinker used in Example 1 is synthesized as follows:

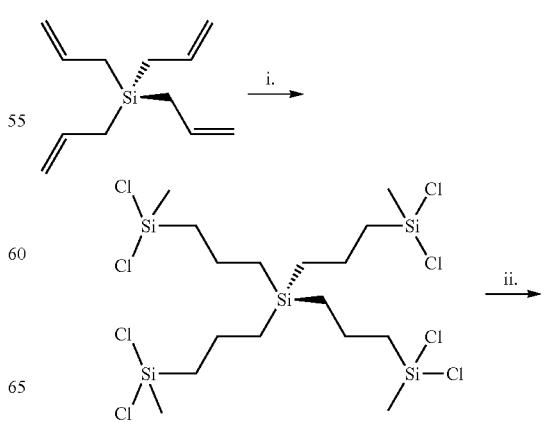

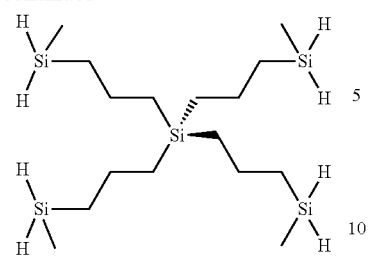

i. MeCh₂SiH, PhMe, 40° C., 18 hr
ii. LAH, THF, 23° C., 18 hr

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A macromolecular network derived from the reaction of:

(a) one or more polymers have a weight average molecular weight of from about 500 Da to about 200,000 Da said one or more polymers being the polymerization product of one or more monomers selected from the group consisting of:

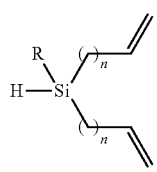

wherein R is selected from the group consisting of an alkyl, an aryl, a halogen or an alkoxy, and each indice n is independently an integer from 0 to 5,

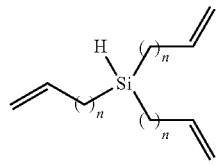

wherein each indice n is independently an integer from 0 to 5;

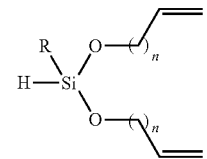

wherein R is selected from the group consisting of an alkyl, an aryl, a halogen or an alkoxy, and each indice n is independently an integer from 0 to 5;

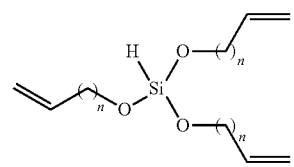

wherein each indice n is independently an integer from 0 to 5; and (b) one or more silane crosslinking agents, said one or more silane crosslinking agents being:

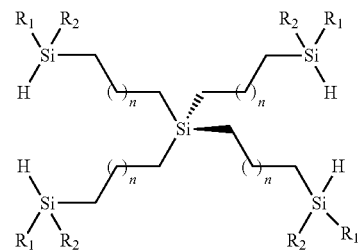

wherein each $R_1$ and $R_2$, is independently selected from the group consisting of a hydrogen, an alkyl or an aryl and each indice n is independently an integer of 0 or 1;

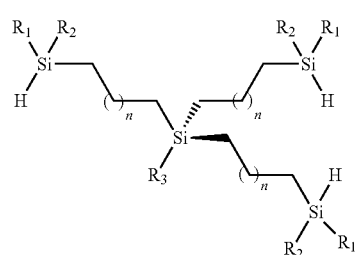

wherein each $R_1$, $R_2$, and $R_3$ is independently selected from the group consisting of a hydrogen, an alkyl or an aryl and each indice n is independently an integer of 0 or 1; and/or

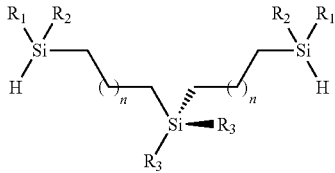

wherein each $R_1$, $R_2$, and $R_3$ is independently selected from the group consisting of a hydrogen, an alkyl or an aryl and each indice n is independently an integer of 0 or 1.

2. The macromolecular network according to claim 1 wherein said one or more polymer's reactive groups are covalently bound to said polymer's backbone via a covalent bond to a silicon atom.

3. The macromolecular network according to claim 1 wherein said one or more polymers have a weight average molecular weight of from about 10,000 Da to about 100,000 Da.

4. The macromolecular network according to claim 1 wherein for said one or more monomers comprising an R moiety, each R is independently selected from the group consisting of —$CH_3$, —$CH_2CH_3$, $CH_2CH_2CH_3$, $C_6H_5$, Br, Cl, I, $OCH_3$, and $OCH_2CH_3$.

5. The macromolecular network according to claim 4 wherein said one or more silane crosslinking agents are:

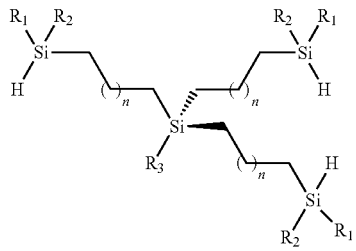

wherein each $R_1$, $R_2$, and $R_3$ is independently selected from the group consisting of a hydrogen, an alkyl or an aryl and each indice n is independently an integer of 0 or 1; and/or

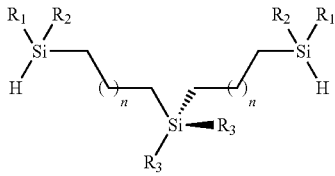

wherein each $R_1$, $R_2$, and $R_3$ is independently selected from the group consisting of a hydrogen, an alkyl or an aryl and each indice n is independently an integer of 0 or 1.

6. The macromolecular network according to claim 1 wherein for said one or more silane crosslinking agents comprising an $R_1$, $R_2$, and/or $R_3$ moiety, each of said $R_1$, $R_2$, and/or $R_3$ moieties is independently selected from the group consisting of —H, —$CH_3$, —$CH_2CH_3$, $CH_2CH_2CH_3$ and $C_6H_5$.

7. The macromolecular network according to claim 5 wherein for said one or more silane crosslinking agents comprising an $R_1$, $R_2$, and/or $R_3$ moiety, each of said $R_1$, $R_2$, and/or $R_3$ moieties is independently selected from the group consisting of —H, —$CH_3$, —$CH_2CH_3$, $CH_2CH_2CH_3$ and $C_6H_5$.

8. The macromolecular network according to claim 1 wherein said one or more polymers and said one or more silane crosslinking agents are present at a weight ratio of from about 1:10 to about 10:1.

9. The macromolecular network according to claim 1 wherein said one or more polymers and said one or more silane crosslinking agents are present at a weight ratio of from about 1:6 to about 6:1.

10. The macromolecular network according to claim 1 wherein said one or more polymers and said one or more silane crosslinking agents are present at a weight ratio of from about 1:3 to about 3:1.

11. The macromolecular network according to claim 7 wherein said one or more polymers and said one or more silane crosslinking agents are present at a weight ratio of from about 1:10 to about 10:1.

12. The macromolecular network according to claim 7 wherein said one or more polymers and said one or more silane crosslinking agents are present at a weight ratio of from about 1:6 to about 6:1.

13. The macromolecular network according to claim 7 wherein said one or more polymers and said one or more silane crosslinking agents are present at a weight ratio of from about 1:3 to about 3:1.

14. A process of making a macromolecular network comprising reacting one or more polymers and one or more silane crosslinking agents, said one or more polymers and said one or more silane crosslinking agents being reacted in a ratio of from about 1:10 to about 10:1, said one or more polymers being the polymerization product of one or more monomers selected from the group consisting of:

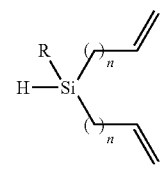

wherein R is selected from the group consisting of an alkyl, an aryl, a halogen or an alkoxy, and each indice n is independently an integer from 0 to 5

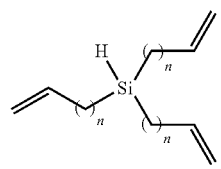

wherein each indice n is independently an integer from 0 to 5;

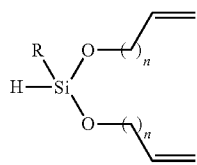

wherein R is selected from the group consisting of an alkyl, an aryl, a halogen or an alkoxy, and each indice n is independently an integer from 0 to 5;

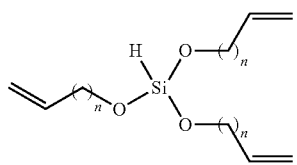

wherein each indice n is independently an integer from 0 to 5 and said one or more silane crosslinking agents are selected from the following crosslinkers or mixtures thereof:

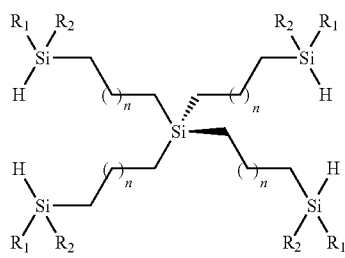

wherein each $R_1$ and $R_2$, is independently selected from the group consisting of a hydrogen, an alkyl or an aryl and each indice n is independently an integer of 0 or 1;

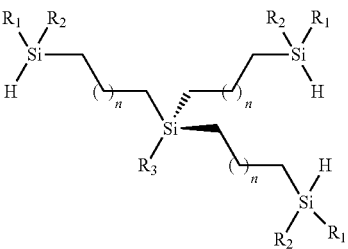

wherein each $R_1$, $R_2$, and $R_3$ is independently selected from the group consisting of a hydrogen, an alkyl or an aryl and each indice n is independently an integer of 0 or 1;

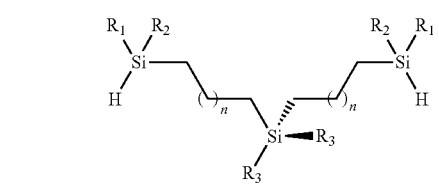

wherein each $R_1$, $R_2$, and $R_3$ is independently selected from the group consisting of a hydrogen, an alkyl or an aryl and each indice n is independently an integer of 0 or 1.

15. A process of making a ceramic said process comprising curing a macromolecular network according to claim 14 via heating.

16. A process of making a ceramic according to claim 15 wherein said curing comprises heating said macromolecular network two or more times, with at least one of said heating steps being conducted in an inert atmosphere.

* * * * *